(12) United States Patent
Leu

(10) Patent No.: US 6,771,520 B1
(45) Date of Patent: Aug. 3, 2004

(54) RECTIFIER OF A POWER SUPPLY

(76) Inventor: Weison Leu, 4F, No. 17, Lane 48, Sungchiang Street, Panchiao City, Taipei Hsien (TW)

( * ) Notice: Subject to any disclaimer, the term of this patent is extended or adjusted under 35 U.S.C. 154(b) by 0 days.

(21) Appl. No.: 10/374,981

(22) Filed: Feb. 28, 2003

(51) Int. Cl.$^7$ ............................................... H02H 7/125
(52) U.S. Cl. ....................................................... 363/52
(58) Field of Search ............................. 363/50, 52, 53, 363/125, 127

(56) References Cited

U.S. PATENT DOCUMENTS

| | | | | |
|---|---|---|---|---|
| 3,978,393 A | * | 8/1976 | Wisner et al. | 323/272 |
| 4,488,212 A | * | 12/1984 | Rettig | 363/54 |
| 4,855,892 A | * | 8/1989 | Lower | 363/86 |
| 5,847,369 A | * | 12/1998 | Barritt | 219/622 |
| 6,009,008 A | * | 12/1999 | Pelly | 363/125 |
| 6,462,973 B2 | * | 10/2002 | Moindron | 363/127 |

* cited by examiner

Primary Examiner—Adolf Berhane
(74) Attorney, Agent, or Firm—Rosenberg, Klein & Lee

(57) ABSTRACT

A rectifier of a power supply comprises a delay unit at a front end of a circuit for delaying a transient variation of a power current and then delaying the current to a rectifying end; a driving unit coupling to the delay unit by two inductors for adding an inducting voltage to a voltage of a switch unit at an input end for being converting as a driving voltage and for emitting a state of the driving unit based on a waveform of the driving voltage; and the switch unit being connected to the driving unit for receiving the state of the driving unit and for conducting or cutting-of the power current so that the operation of the switch unit is synchronous with the waveform of the power current.

4 Claims, 4 Drawing Sheets

RECTIFIER OF A POWER SUPPLY

BACKGROUND OF THE INVENTION

(1) Field of the Invention

The present invention relates to a rectifier, and particularly to a rectifier of a power supply which can be used to a switching power supply (SPS).

(2) Description of the Prior Art

With the improvement of electronic technology, the sizes of the products are made smaller and smaller, thereby, the space for receiving a power source becomes smaller. This induces many problem, such as power consumption, efficiency, stability, etc. The power rectifying is important for above mentioned problems since a well rectifying ability will improve the problem of power consumption, efficiency and stability.

Switching power supplies (SPS), as shown in FIG. 1, are frequently used in current electronic device. When current flows through the transformer 10 and then is sent to a rectifier formed by a rectifying device 11 and a fifth capacitor 135. Then the current is transferred to the power output end VO. The rectifier 11 is made of diodes which makes a large power lose. In another prior art, the Metal Oxide Semiconductor Field Effect Transistor (MOSFET) is used to replace a diode since the current waveform can not generate a delay time so that the delay time makes a larger power loss. Therefore, since the synchronization of the current waveform can not be achieved and thus the whole power loss of the switching power supply (SPS) can not be greatly improved.

SUMMARY OF THE INVENTION

Accordingly, the primary object of the present invention is to provide a rectifier of a power supply. The rectifier comprises a delay unit at a front end of a circuit for delaying a transient variation of a power current and then delaying the current to a rectifying end; a driving unit coupling to the delay unit by two inductors for adding an inducting voltage to a voltage of a switch unit at an input end for being converting as a driving voltage and for emitting a state of the driving unit based on a waveform of the driving voltage; and the switch unit being connected to the driving unit for receiving the state of the driving unit and for conducting or cutting-of the power current so that the operation of the switch unit is synchronous with the waveform of the power current.

The various objects and advantages of the present invention will be more readily understood from the following detailed description when read in conjunction with the appended drawing.

BRIEF DESCRIPTION OF THE PREFERRED EMBODIMENTS

Figure 1:
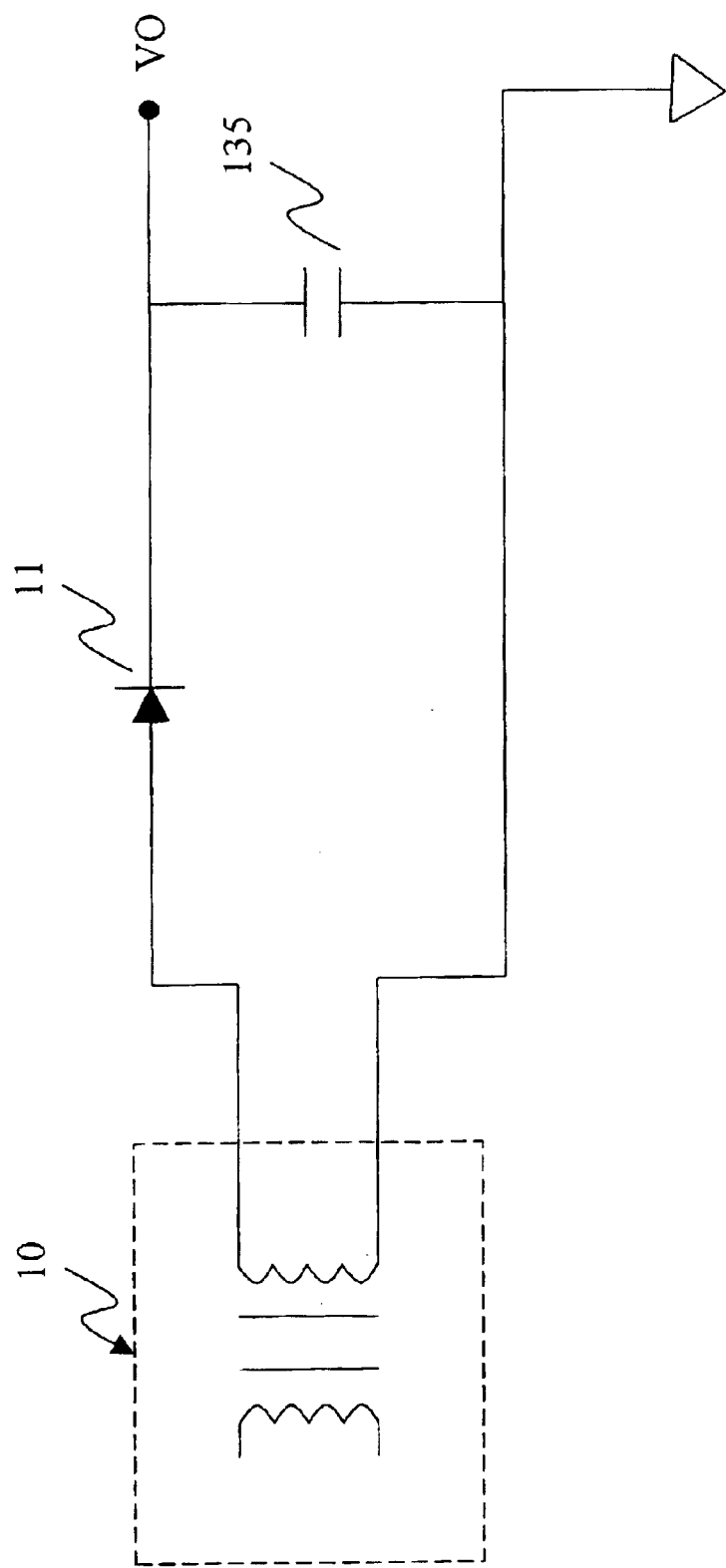
FIG. 1 shows the rectifier of the switching power supply (SPS) in the prior art.
Figure 2:
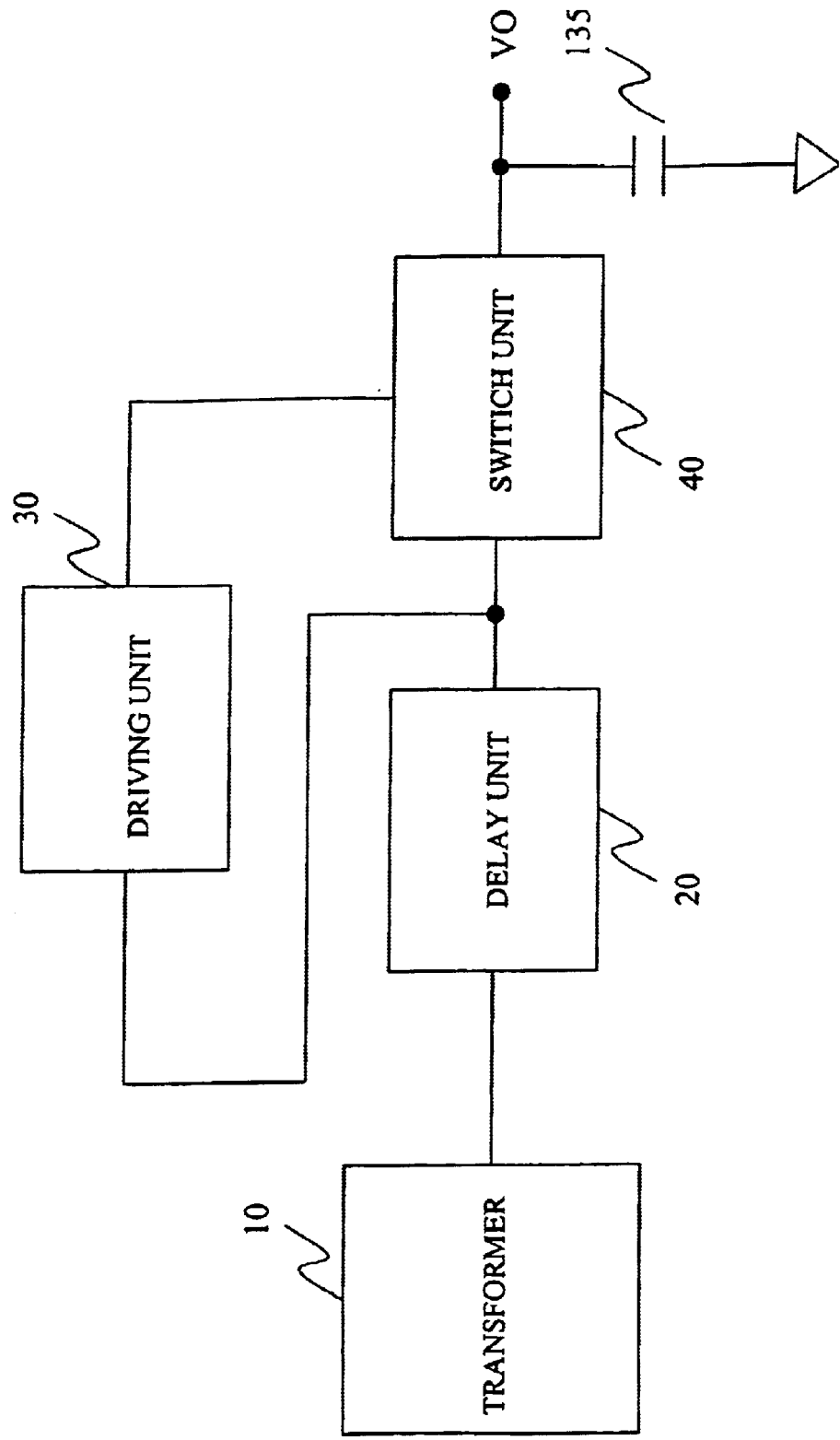
FIG. 2 is a systematic block diagram of the rectifier of the power supply (SPS) of the present invention.

The present invention relates to a rectifier of a power supply. The rectifier can rectify current synchronously and reduce power lose. As shown in FIG. 2, the systematic block diagram of the rectifier of power supply is illustrated.

The rectifying device of a power supply of the present invention includes a delay unit 20, a driving unit 30, and a switch unit 40. The delay unit 20 is connected to a transformer 10. The delay unit 20 serves to delay transient variation of a power current to be rectified. After delaying, the current is transferred to the driving unit 30 ad switch unit 40. The driving unit 30 converts the power current as a driving voltage and emit a driving signal according to the waveform of the driving voltage. After the switch unit 40 receives the driving signals, the power current can be turned on or off. Thereby, after the waveform of the power current and the switch unit 40 are synchronous. Then the current is transferred to a fifth capacitor and a power output end VO.

Figure 3:
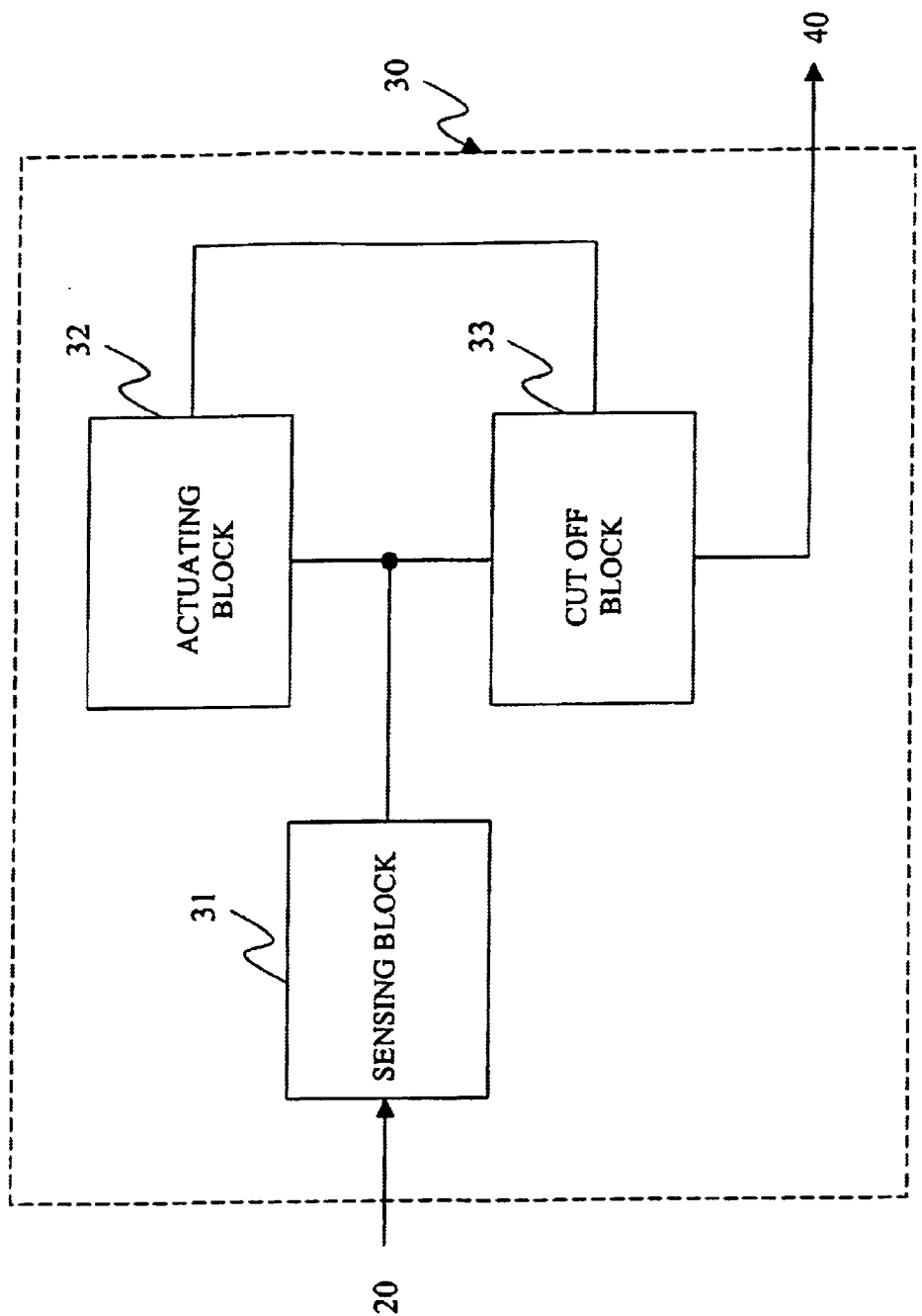
FIG. 3 shows the block diagram of the driving unit of the power supply of the present invention.

In the following, the driving unit 30 will be described further. Referring to FIG. 3, the flow diagram of the rectifying device of the power supply is illustrated.

In the present invention, to synchronize the operation of the waveform of the power current and the switch unit 40, the driving unit 30 further includes a sensing block 31, an actuating block 32, and a cut off block 33. The sensing block 31 is connected to the delay unit 20 for receiving the switch unit 40 to conduct so that the power current is transferred to an power output end VO. The cut off block 33 is connected to the sensing block 31. When the driving voltage is a negative half period, the switch unit 40 will be closed for cutting the power current.

Figure 4:
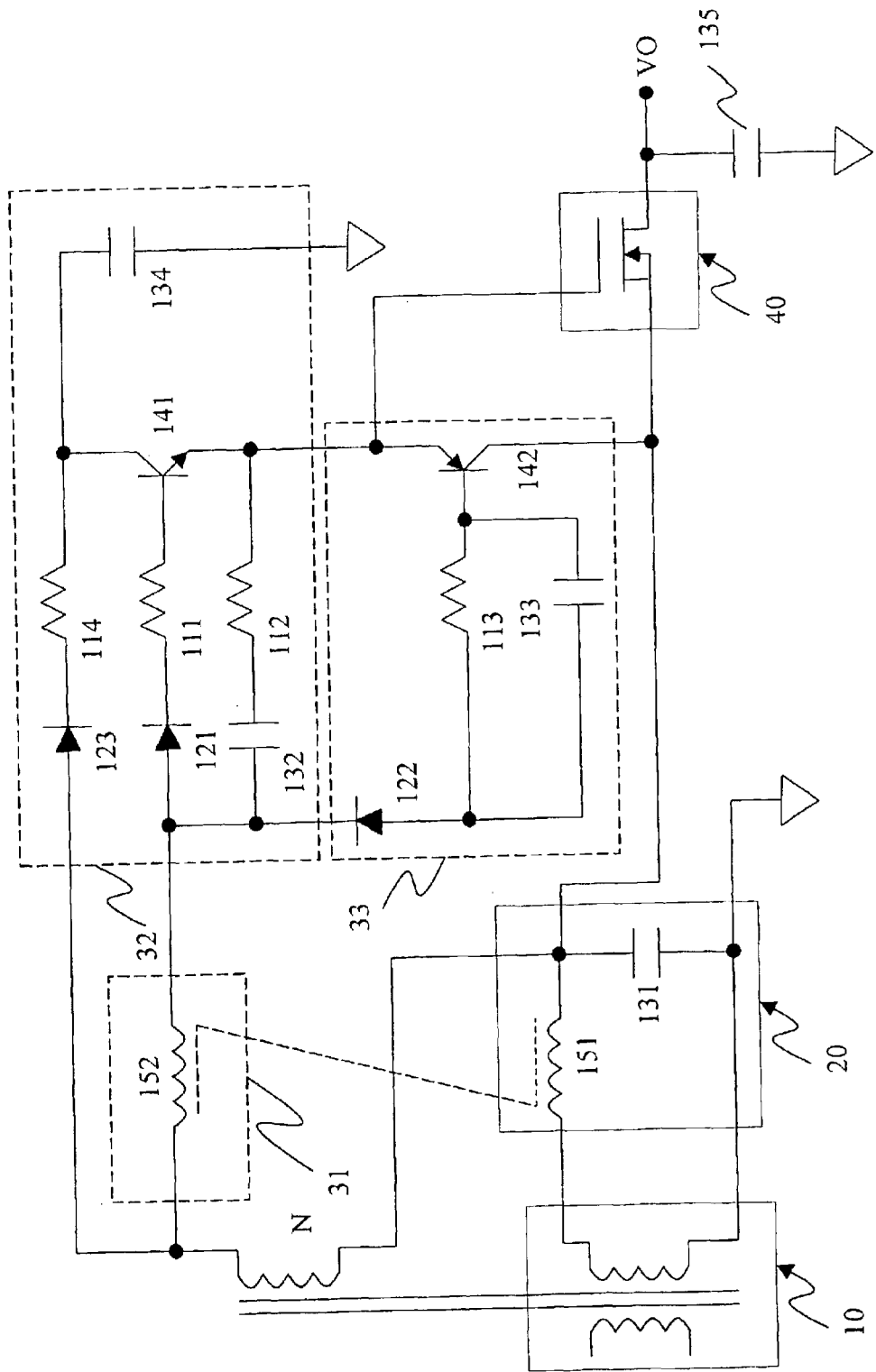
FIG. 4 shows the circuit diagram of the embodiment of the rectifier of the power supply according to the present invention.

Finally, the detail of the present invention will be described. Referring to FIG. 4, one embodying circuit of the power supply of the present invention is illustrated.

The present invention is installed in an interchangeable power supply. At first, the current is converted through a transformer 10 and then is transferred to a delay unit 20. The delay unit 20 is a first inductor 151 and a first capacitor 131 which are serially connected as an LC circuit. The first inductor 151 will cut off the transient variation of the current and charge the first capacitor. Once the first inductors enters into a saturation region, the current will pass through the delay unit 20 to be transferred to the switch unit 40 so as to induce a delay effect of the delay unit 20.

The delay unit 20 includes the sensing block 31, actuating block 32 and cut off block 33. The sensing block 31 is an inducing coil N and a second inductor 152 for sensing a driving voltage. A signal identical to a waveform to be rectified from the inducing coil N is overlapped with the second inductor 152 to form the driving voltage. When the driving voltage is at a positive half cycle, a third diode 123, a fourth resistor 114 and a fourth capacitor 134 are serially connected. Current is transferred to the first transistor 141. The first diode 121 is serially connected to the first resistor 111 and then further serially connected to the first transistor 141. Then the second capacitor 132 is serially connected to the second resistor 112. The two are connected in parallel to from an acceleration circuit for transferring current to a switch unit 40. Then the voltage between gate and source increases rapidly so that the MOSFET is conductive rapidly. The second transistor 142 is connected to the third resistor 113 and then is connected to the third capacitor 133 in parallel to form a quick cut off circuit when the driving voltage coverts from positive half cycle to negative half cycle. The switch unit 40 is formed by MOSFETs.

It is knows from above description, when the delay unit 20 transfers power to the switch unit 40, the driving unit 30 can be turn-on so that the operation of the switch unit 40 is synchronous with the delay unit 20 for rectifying. Thereby, the loss of the whole switching power supply is reduced.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A rectifier of a power supply, the rectifier comprising:
   a delay unit at a front end of a circuit for delaying a transient variation of a power current and then delaying the current to a rectifying end;
   a driving unit coupling to the delay unit by two inductors for adding an inducting voltage to a voltage of a switch unit at an input end for being converting as a driving voltage and for emitting a state of the driving unit based on a waveform of the driving voltage; and
   the switch unit being connected to the driving unit for receiving the state of the driving unit and for conducting or cutting-of the power current so that the operation of the switch unit is synchronous with the waveform of the power current.

2. The rectifier of a power supply as claimed in claim 1, wherein the delay unit device comprising:
   a first inductor for being connected to a power to be rectified; the first inductor serving for receiving the power current and delaying transient variation of the power current; and
   a first capacitor serially connected to the first inductor so as to have a delaying effect.

3. The rectifier of a power supply as claimed in claim 1, wherein the driving voltage further comprising:
   an inducing block connected to the delay unit; the inducing block serving for receiving the power current; and converting the power current to the driving voltage for transferring to the actuating block and cut off block;
   the actuating block connected to the inducing block and further comprising:
   a first diode serially connected to a first resistor; and
   a second capacitor serially connected to second resistor and connected to the second diode and first resistor in parallel; then it is connected to a first transistor; the actuating block driving the switch unit to conduct when the voltage is in positive half cycle so as to conduct the switch unit to conduct; thereby, the power current is transferred to a power output end; and
   the cut off block connected to the inducing block; the cut off block further comprising:
   a second diode serially connected to the inducing block and a third resistor; and
   a third capacitor parallel connected to the third resistor and serially connected to the second transistor; wherein the cut off block serving for closing the switch unit when the driving voltage in a negative half cycle and cutting off the power current.

4. The rectifier of a power supply as claimed in claim 3, wherein the inducing block comprising an input signal and is serially connected to a current inducing element;
   an input signal for switching the switch unit and having a waveform identical to a rectifying current;
   a second inductor coupling to the delay unit for sensing an acceleration signal; the signal overlapping a waveform of the same phase so as to form a high speed driving waveform of the switch unit.

* * * * *